United States Patent
Huang-Fu et al.

(10) Patent No.: US 11,115,896 B2
(45) Date of Patent: Sep. 7, 2021

(54) HANDLING QOS RULES ON QOS OPERATION ERRORS

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/829,239

(22) Filed: Mar. 25, 2020

(65) Prior Publication Data
US 2020/0322869 A1 Oct. 8, 2020

Related U.S. Application Data

(60) Provisional application No. 62/827,913, filed on Apr. 2, 2019.

(51) Int. Cl.
*H04W 40/12* (2009.01)
*H04W 28/24* (2009.01)
*H04W 80/02* (2009.01)
*H04W 84/04* (2009.01)
*H04W 28/02* (2009.01)

(52) U.S. Cl.
CPC ....... *H04W 40/12* (2013.01); *H04W 28/0268* (2013.01); *H04W 28/24* (2013.01); *H04W 80/02* (2013.01); *H04W 84/042* (2013.01)

(58) Field of Classification Search
CPC ..... H04W 40/12; H04W 28/24; H04W 80/02; H04W 84/042; H04W 28/0268; H04W 24/00; H04W 76/22; H04B 17/00; H04B 3/46; H04L 43/00; H04L 43/50
See application file for complete search history.

(56) References Cited

U.S. PATENT DOCUMENTS

2020/0296221 A1* 9/2020 Zhou ................. H04W 28/0268

FOREIGN PATENT DOCUMENTS

| CN | 109548088 A | 7/2017 |
| WO | WO2017196386 A1 | 5/2016 |

OTHER PUBLICATIONS

Ye, Zhen, et al. "Long-term QoS-aware cloud service composition using multivariate time series analysis." IEEE Transactions on Services Computing 9.3 (2014): 382-393. (Year: 2014).*

(Continued)

*Primary Examiner* — Shared Rampuria
(74) *Attorney, Agent, or Firm* — Imperium Patent Works LLP; Zheng Jin (57) ABSTRACT

A method of enhanced error handling for 5G QoS operations associated with a PDU session is proposed. A QoS operation can be received via a PDU session modification procedure. In one example, the QoS operation is to create a new QoS rule for a PDU session, however, there is an existing QoS rule having the same QoS rule ID (QRI). The UE detects whether the QoS operation will causing the PDU session have no default QoS rule or have more than one default QoS rules. If the existing QoS rule is a default QoS rule, or if the new QoS rule have a default QoS rule (DQR) indication bit set to be true, then the UE rejects the QoS operation and indicates a QoS operation error to the network.

16 Claims, 4 Drawing Sheets

(56) References Cited

OTHER PUBLICATIONS

International Search Report and Written Opinion of International Search Authority for PCT/CN2020/081984 dated Jun. 30, 2020 (10 pages).
C1-192600 3GPP TSG-CT WG1 Meeting #116, MediaTek Inc., Correction on QoS rule operation, Xi'an, P.R. of China, Apr. 8-12, 2019 (12 pages) *pages 2 to 4*.
C1-192391 3GPP TSG-CT WG1 Meeting #116, MediaTek Inc., Correction on QoS rule operation, Xi'an, P.R. of China, Apr. 8-12, 2019 (6 pages) *pages 3 to 5*.
C1-192392 3GPP TSG-CT WG1 Meeting #116, MediaTek Inc., Correction on QoS rule operation, Xi'an, P.R. of China, Apr. 8-12, 2019 (6 pages) *pages 3 to 5*.
3GPP TS 24.501 V15.3.0 (Mar. 2019), 3rd Generation Partnership Project; Technical Specification Group Core Network and Terminals; Non-Access-Stratum (NAS) protocol for 5G (5GS); Stage 3 (Release 15), *pp. 211 to 214 and 224*.

* cited by examiner

HANDLING QOS RULES ON QOS OPERATION ERRORS

CROSS REFERENCE TO RELATED APPLICATIONS

This application claims priority under 35 U.S.C. § 119 from U.S. Provisional Application No. 62/827,913, entitled "Enhancement of QoS rule operation", filed on Apr. 2, 2019, the subject matter of which is incorporated herein by reference.

TECHNICAL FIELD

The disclosed embodiments relate generally to wireless communication, and, more particularly, to method of handling Quality of Service (QoS) operation errors in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LTE EPS bearer or to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule. For additional details of the default QoS rule, please refer to patent application Ser. No. 16/366,106 filed on Mar. 27, 2019, and patent application Ser. No. 16/366,125 filed on Mar. 27, 2019, the subject of which is incorporated by reference.

Based on the current QoS rule error handling, when a QoS rule operation is "Create new QoS rule" and there is already an existing QoS rule with the same QoS rule identifier, and if the existing QoS rule is not the default QoS rule, then UE shall not diagnose an error and further process the create request, and if the creation was processed successfully, the UE will delete the existing QoS rule. However, the Default QoS Rule (DQR) bit of the new QoS rule may be different from the DQR bit of the existing QoS rule, and thus overriding the existing QoS rule may cause error.

SUMMARY

A method of enhanced error handling for 5G QoS operations associated with a PDU session is proposed. Each PDU session is identified by a PDU session ID, and may include multiple QoS flows and QoS rules. Within a PDU session, there should be one and only one default QoS rule. A QoS operation can be received via a PDU session modification procedure (via PDU session modification command message) in 5G NR networks or an EPS session management (ESM) procedure (via EPS bearer context request message) in 4G LTE networks. In one example, the QoS operation is to create a new QoS rule, however, there is an existing QoS rule having the same QoS rule ID (QRI) as the new QoS rule. The UE detects whether the QoS operation will causing the PDU session have no default QoS rule or have more than one default QoS rules. If the existing QoS rule is a default QoS rule, or if the new QoS rule have a default QoS Rule (DQR) indication bit set to be true, then the UE rejects the QoS operation and indicates a QoS operation error to the network.

In one embodiment, a UE receives Quality of Service (QoS) rule configuration in a mobile communication network for performing a QoS operation on a new QoS rule associated with a protocol data unit (PDU) session having a default QoS rule. The new QoS rule have a QoS rule ID (QRI) and a default QoS rule (DQR) indicator. The UE determines that there is an existing QoS rule associated with the same PDU session. The existing QoS rule has the same QRI as the new QoS rule. The UE detects whether the existing QoS rule is the default QoS rule or the DQR indicator indicates that the new QoS rule becomes the default QoS rule. In step 504, the UE transmits a QoS operation error code to the network when either the existing QoS rule is the default QoS rule or the DQR indicator indicates the new QoS becomes the default QoS rule.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
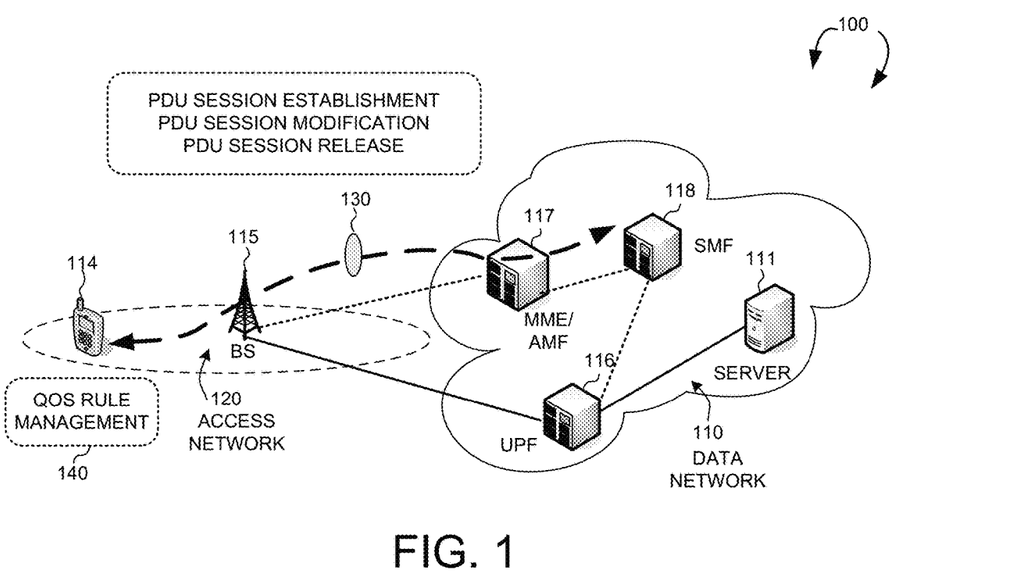
FIG. 1 illustrates an exemplary EPS/5GS network supporting Quality of Service (QoS) rule management in accordance with one novel aspect.

FIG. 1 illustrates an exemplary 4G LTE or 5G new radio (NR) network 100 supporting Quality of Service (QoS) rule management in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS/gNB 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PDU) sessions and managing session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP packets, and provide users with Always-On IP Connectivity. When UE joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the P-GW. The P-GW is the default gateway for the UE's IP access. EPS has defined a Default EPS Bearer to provide the IP Connectivity that is Always-On.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule. A default QoS rule (DQR) indication bit is used as an indicator to indicate whether a QoS rule is a default QoS rule.

In the current 5G non-access stratum (NAS) specification, based on QoS rule operation codes defined in the QoS rule IE, the allowed many different QoS rule operations including create, modify, and delete QoS rule and packet filters via PDU session establishment and modification procedures. Based on the current QoS rule error handling, when a QoS rule operation is "Create new QoS rule" and there is already an existing QoS rule with the same QoS rule identifier, and if the existing QoS rule is not the default QoS rule, then UE shall not diagnose an error and further process the create request, and if the creation was processed successfully, the UE will delete the existing QoS rule. However, the Default QoS Rule (DQR) bit of the new QoS rule may be different from the DQR bit of the existing QoS rule, and thus overriding the existing QoS rule may cause error.

In accordance with one novel aspect, UE behavior and error handling are defined for QoS rule operations via PDU session modification procedures. The default QoS rule (DQR) indicator and the QoS flow identifier (QFI) of a signaled QoS rule should not be changed. The UE should check the QoS rule configuration provided in the PDU session modification command message for different types of QoS rule errors. In the example of FIG. 1, UE 114 establishes a PDU session and performs a QoS operation via a PDU session modification procedure with the network over non-access stratum (NAS) layer signaling 130. Upon receiving the QoS rule configuration, UE 114 performs QoS rule management as depicted by 140. In one example, the QoS rule operation is "Create new QoS rule" and there is already an existing QoS rule with the same QoS rule identifier. If the existing QoS rule is not the default QoS rule and the DQR bit is set to "the QoS rule is not the default QoS rule", then UE 114 shall not diagnose an error, further process the create request and, if it was processed successfully, delete the old QoS rule. Otherwise, if the existing QoS rule is the default QoS rule or the DQR bit is set to "the QoS rule is the default QoS rule", then UE 114 shall reject the PDU SESSION MODIFICATION COMMAND message with a proper 5GSM cause (e.g., #83 "semantic error in the QoS operation").

Figure 2:
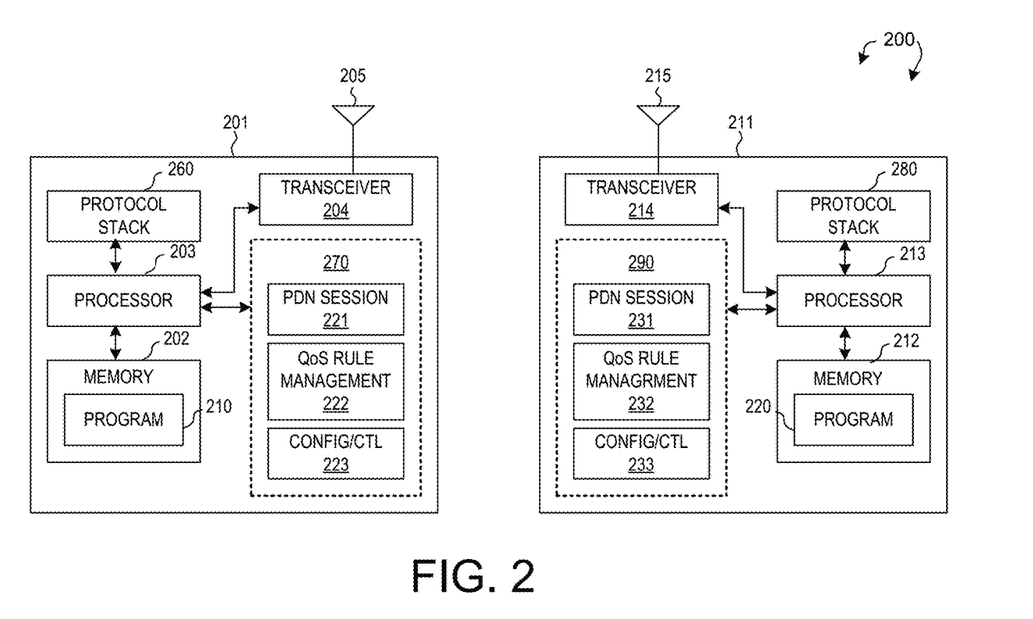
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME/AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF/SMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS rule management circuit 222 that determines any conflict of the default QoS rules and handles QoS rule management by detecting semantic error and syntactical error, a config and control circuit 223 that handles configuration and control parameters.

A command message from the network carries QoS configuration and operation for a new QoS rule (for creating new QoS rule) or QoS rule parameters and/or packet filter parameters (for modifying existing QoS rule). The QoS operation can be received via a PDU session modification procedure (via PDU session modification command message) in 5G NR networks or an EPS session management (ESM) procedure (via EPS bearer context request message) in 4G LTE networks.

Figure 3:
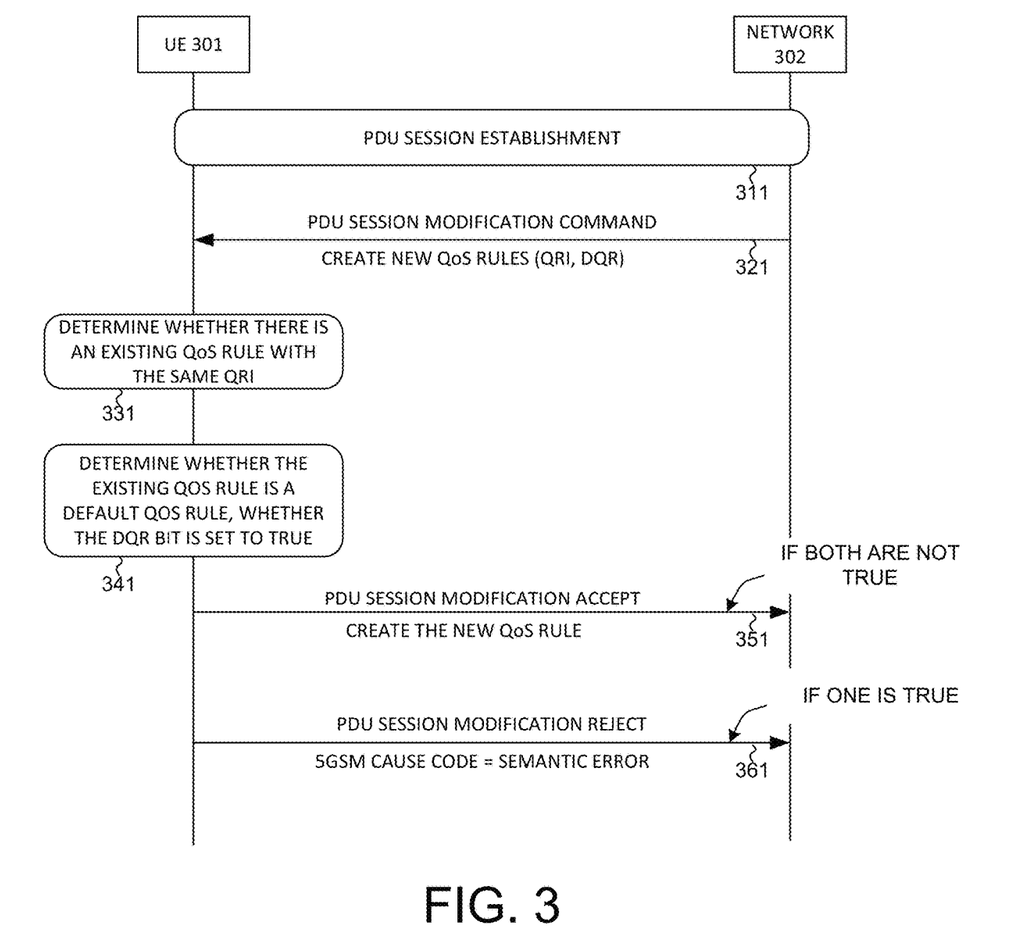
FIG. 3 illustrates one embodiment of QoS rule operation with semantic error for PDU session modification procedure in accordance with one novel aspect.

FIG. 3 illustrates one embodiment of QoS rule operation with semantic error for PDU session modification procedure in accordance with one novel aspect. In step 311, UE 301 and network 302 establish and/or maintain a PDU session via a PDU session establishment procedure. The PDU session may be established to comprise one or more QoS rules, including one default QoS rule. In step 321, network 302 sends a PDU session modification command message to UE 301. The command message is for UE to perform certain QoS operations for the PDU session, for example, to create a new QoS rule. The new QoS rule has a QRI and a DRQ bit, which is an indicator indicating whether the new QoS rule becomes a default QoS rule. UE 301 needs to determine whether the QoS operation would result in the PDU session to have no default QoS rule or have more than one default QoS rules. If so, then an operation error occurs in the QoS operation.

Specifically, in step 331, UE 301 determines whether there is an existing QoS rule having the same QRI as the to-be-created new QoS rule. If yes, then UE goes to step 341 and determines whether the existing QoS rule is a default QoS rule, and whether the DQR bit of the to-be-created new QoS rule is set to be true (e.g., the DRQ indication bit indicates that "the QoS rule is the default QoS rule"). If the answer to both determination in step 341 is no, that means the existing QoS rule is not a default QoS rule, and the to-be-created new QoS rule will not become a default QoS rule. As a result, the UE should not diagnose an error and process the QoS operation. In step 351, UE 301 processes the QoS operation. If the QoS operation is processed successfully, then UE 301 deletes the existing QoS rule.

On the other hand, if the answer to at least one of the determinations in step 341 is yes, that means that either the existing QoS rule is a default QoS rule, or the to-be-created new QoS rule will become a default QoS rule, or both. Such QoS operation would result in the PDU session to have no default QoS rule or have more than one default QoS rule. In a first example, the existing QoS rule is a default QoS rule, and the DQR bit of the new QoS rule is not set. Replacing the existing QoS rule with the new QoS rule will cause the PDU session to have no default QoS rule. In a second example, the existing QoS rule is not a default QoS rule, and the DQR bit of the new QoS rule is set. Replacing the existing QoS rule with the new QoS rule will cause the PDU session to have two default QoS rules (the PDU session already has another QoS rule that is the default QoS rule). In a third example, the existing QoS rule is a default QoS rule, and the DQR bit of the new QoS rule is also set. This QoS operation is also not allowed because a default QoS rule can only be modified, but cannot be replaced by a new QoS rule having the same QRI. Therefore, in step 361, UE 301 rejects the PDU session modification command message, which includes the 5GSM cause value #83 indicating "semantic error in the QoS operation".

Figure 4:
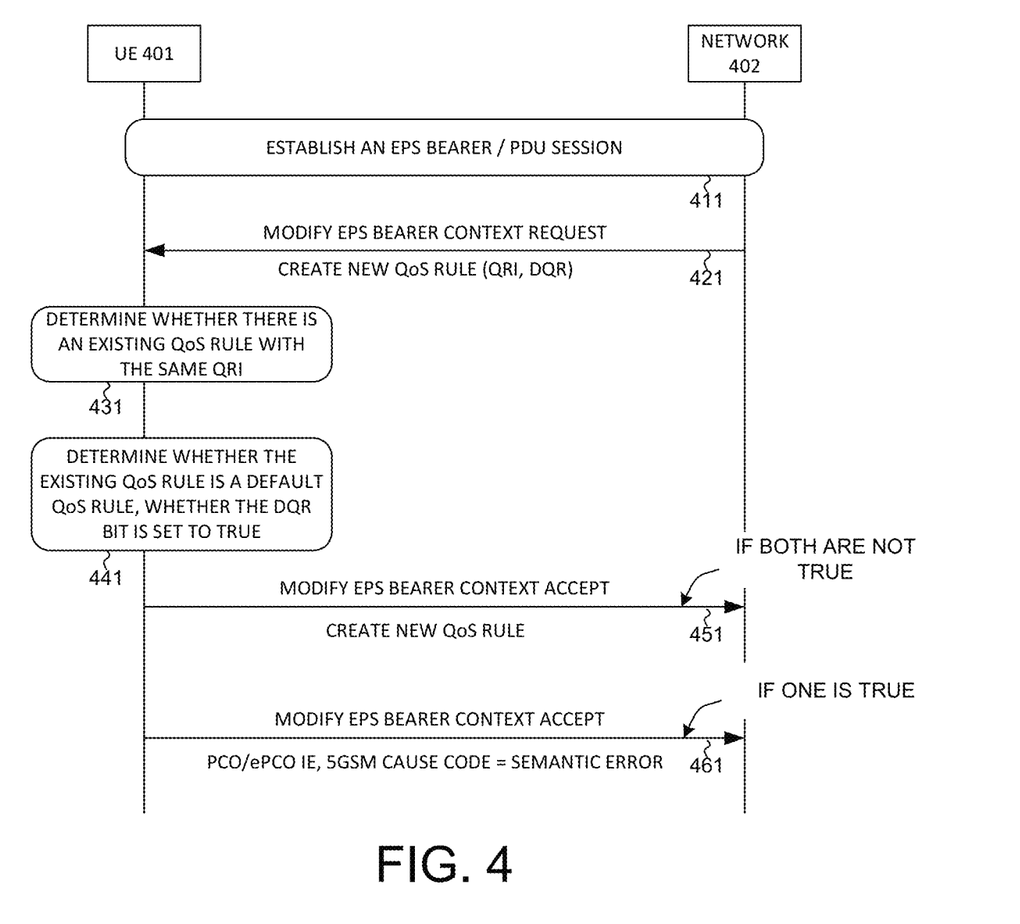
FIG. 4 illustrates one embodiment of QoS rule operation with semantic error for EPS session management procedure in accordance with one novel aspect.

FIG. 4 illustrates one embodiment of QoS rule operation with semantic error for EPS session management (ESM) procedure in accordance with one novel aspect. In step 411, UE 401 and network 402 establish and/or maintain an PDN connection which is associated with a PDU session. The PDU session may comprise one or more QoS rules, including one default QoS rule. In step 421, network 402 sends a modify EPS bearer context request message to UE 401. The request message includes a protocol configuration options IE or an extended protocol configuration options IE (PCO/ePCO IE) for UE to perform certain QoS operations for the PDU session, for example, to create a new QoS rule. UE 401 needs to determine whether the QoS operation would result in the PDU session to have no default QoS rule or have more than one default QoS rules. If so, then a QoS operation error occurs.

Specifically, in step 431, UE 401 determines whether there is an existing QoS rule having the same QRI as the to-be-created new QoS rule. If yes, then UE goes to step 441 and determines whether the existing QoS rule is a default QoS rule, and whether the DQR indication bit of the to-be-created new QoS rule is set (e.g., set to indicate "the QoS rule is the default QoS rule"). If the answer to both determination in step 441 is no, that means the existing QoS rule is not a default QoS rule, and the to-be-created new QoS rule will not be a default QoS rule. As a result, the UE should not diagnose an error and process the QoS operation. In step

451, UE 401 sends a modify EPS bearer context accept message to network 402 and creates the new QoS rule. If the QoS operation was processed successfully, then UE 401 deletes the existing QoS rule. On the other hand, if the answer to at least one of the determinations in step 441 is yes, that means that either the existing QoS rule is a default QoS rule, or the to-be-created new QoS rule will become a default QoS rule, or both. Such QoS operation would result in the PDU session to have no default QoS rule or have more than one default QoS rule. Therefore, in step 461, UE 401 sends a modify EPS bearer context accept message to network 402, which includes a protocol configuration options IE or an extended protocol configuration options IE (PCO/ePCO IE) that carries a 5GSM cause value #83 indicating "semantic error in the QoS operation".

Figure 5:
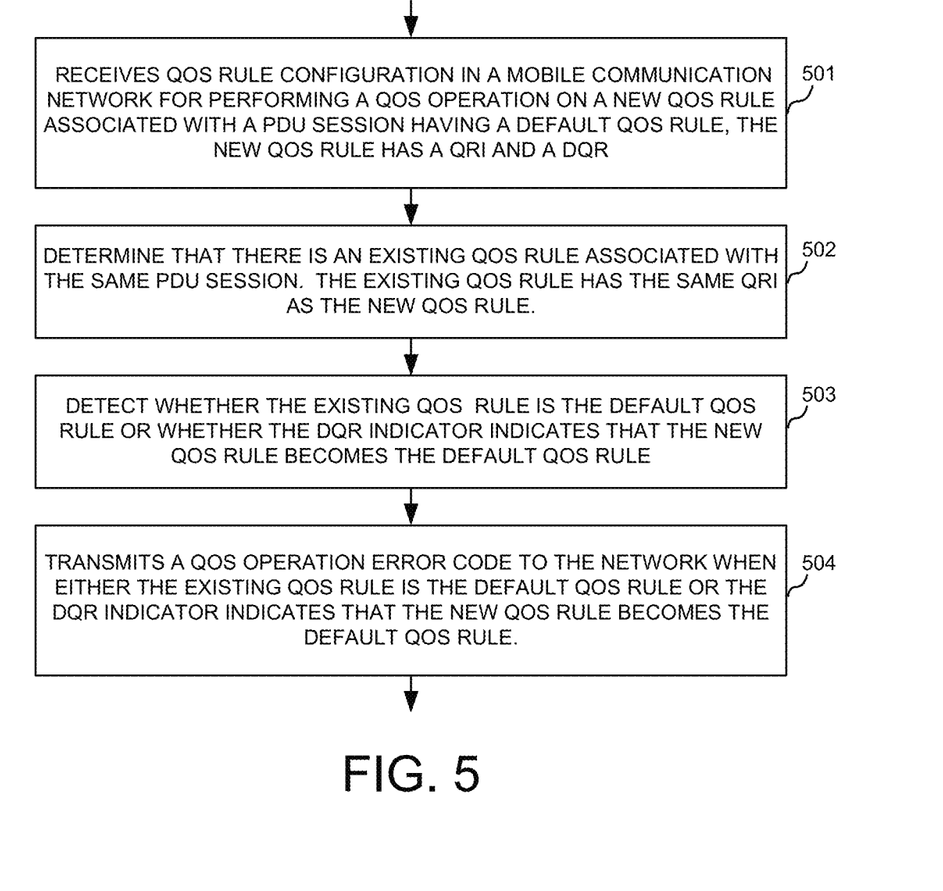
FIG. 5 is a flow chart of a method of QoS rule management handling semantic error in accordance with one novel aspect.

FIG. 5 is a flow chart of a method of QoS rule management handling semantic error in accordance with one novel aspect. In step 501, a UE receives Quality of Service (QoS) rule configuration in a mobile communication network for performing a QoS operation on a new QoS rule associated with a protocol data unit (PDU) session having a default QoS rule. The new QoS rule have a QoS rule ID (QRI) and a default QoS rule (DQR) indicator. In step 502, the UE determines that there is an existing QoS rule associated with the same PDU session. The existing QoS rule has the same QRI as the new QoS rule. In step 503, the UE detects whether the existing QoS rule is the default QoS rule or the DQR indicator indicates that the new QoS rule becomes the default QoS rule. In step 504, the UE transmits a QoS operation error code to the network when either the existing QoS rule is the default QoS rule or the DQR indicator indicates the new QoS becomes the default QoS rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving Quality of Service (QoS) rule configuration by a user equipment (UE) in a mobile communication network for performing a QoS operation on a new QoS rule associated with a protocol data unit (PDU) session having a default QoS rule, wherein the new QoS rule have a QoS rule ID (QRI) and a default QoS rule (DQR) indicator;
   determining that there is an existing QoS rule associated with the same PDU session, wherein the existing QoS rule has the same QRI as the new QoS rule;
   detecting whether the existing QoS rule is the default QoS rule and whether the DQR indicator indicates that the new QoS rule becomes the default QoS rule; and
   transmitting a QoS operation error code to the network when either the existing QoS rule is the default QoS rule or when the DQR indicator indicates that the new QoS rule becomes the default QoS rule;
   furthermore proceeding with the QoS operation without diagnosing an error when the existing QoS rule is not the default QoS rule and the DQR indicator indicates that the new QoS rule is not the default QoS rule.

2. The method of claim 1, wherein the QoS rule configuration is received via a PDU session modification command message for the UE to perform the QoS operation.

3. The method of claim 2, wherein the QoS operation is for the UE to "create new QoS rule" via the PDU session modification command.

4. The method of claim 2, wherein the UE rejects the PDU session modification command message with a 5G session management (5GSM) cause value indicating an error of the QoS operation.

5. The method of claim 1, wherein the UE deletes the existing QoS rule when the QoS operation is proceeded successfully.

6. The method of claim 1, wherein the QoS rule configuration is received via a modify EPS bearer context request message for the UE to perform the QoS operation.

7. The method of claim 6, further comprising:
   proceeding with the QoS operation without diagnosing an error when the existing QoS rule is not the default QoS rule and the DQR indicator indicates that the new QoS rule is not the default QoS rule.

8. The method of claim 7, further comprising:
   deleting the existing QoS rule when the QoS operation is proceeded successfully.

9. A User Equipment (UE), comprising:
   a receiver that receives Quality of Service (QoS) rule configuration by a user equipment (UE) in a mobile communication network for performing a QoS operation on a new QoS rule associated with a protocol data unit (PDU) session having a default QoS rule, wherein the new QoS rule have a QoS rule ID (QRI) and a default QoS rule (DQR) indicator;
   a QoS rule management circuit that determines there is an existing QoS rule associated with the same PDU session, wherein the existing QoS rule has the same QRI as the new QoS rule, wherein the UE also detects whether the existing QoS rule is the default QoS rule and whether the DQR indicator indicates that the new QoS rule becomes the default QoS rule; and
   a transmitter that transmits a QoS operation error code to the network when either the existing QoS rule is the default QoS rule or when the DQR indicator indicates that the new QoS rule becomes the default QoS rule;
   furthermore proceeding with the QoS operation without diagnosing an error when the existing QoS rule is not the default QoS rule and the DQR indicator indicates that the new QoS rule is not the default QoS rule.

10. The UE of claim 9, wherein the QoS rule configuration is received via a PDU session modification command message for the UE to perform the QoS operation.

11. The UE of claim 10, wherein the QoS operation is for the UE to "create new QoS rule" via the PDU session modification command.

12. The UE of claim 10, wherein the UE rejects the PDU session modification command message with a 5G session management (5GSM) cause value indicating an error of the QoS operation.

13. The UE of claim 9, wherein the UE deletes the existing QoS rule when the QoS operation is proceeded successfully.

14. The UE of claim 9, wherein the QoS rule configuration is received via a modify EPS bearer context request message for the UE to perform the QoS operation.

15. The UE of claim 14, wherein the UE proceeds with the QoS operation without diagnosing an error when the existing QoS rule is not the default QoS rule and the DQR indicator indicates that the new QoS rule is not the default QoS rule.

16. The UE of claim 15, wherein the UE deletes the existing QoS rule when the QoS operation is proceeded successfully.

\* \* \* \* \*